United States Patent
McEwan

(10) Patent No.: US 10,550,887 B2
(45) Date of Patent: Feb. 4, 2020

(54) BEARING MATERIAL, BEARING AND METHOD

(71) Applicants: Mahle Engine Systems UK Limited, Rugby (GB); Mahle International GmbH, Stuttgart (DE)

(72) Inventor: Kayleigh McEwan, Coalville (GB)

(73) Assignees: Mahle Engine Systems UK Ltd (GB); Mahle International GmbH (DE)

( * ) Notice: Subject to any disclaimer, the term of this patent is extended or adjusted under 35 U.S.C. 154(b) by 151 days.

(21) Appl. No.: 15/798,378

(22) Filed: Oct. 30, 2017

(65) Prior Publication Data

US 2018/0119740 A1 May 3, 2018

(30) Foreign Application Priority Data

Oct. 31, 2016 (GB) .................................. 1618389.9

(51) Int. Cl.
C08G 73/14 (2006.01)
C08L 79/08 (2006.01)
F16C 33/20 (2006.01)

(52) U.S. Cl.
CPC ............ F16C 33/201 (2013.01); C08G 73/14 (2013.01); C08L 79/08 (2013.01); *F16C 2208/42* (2013.01)

(58) Field of Classification Search
CPC ................ F16C 33/201; F16C 2208/42; F16C 2208/60; C08G 73/1039; C08G 73/1042; C08G 73/14; C08L 79/08
USPC .......................................................... 428/474
See application file for complete search history.

(56) References Cited

U.S. PATENT DOCUMENTS

| 4,203,922 A | 5/1980 | Jones et al. |
| 4,954,610 A * | 9/1990 | Chen, Sr. ............... C08G 73/14 528/172 |
| 4,963,647 A | 10/1990 | Vora et al. |
| 2016/0137787 A1 | 5/2016 | Oka et al. |

FOREIGN PATENT DOCUMENTS

| EP | 3002307 A1 | 4/2016 |
| JP | 2001139880 A | 5/2001 |
| WO | WO-2004/113749 A1 | 12/2004 |
| WO | WO-2010/066396 A1 | 6/2010 |
| WO | WO-2012/050929 A2 | 4/2012 |

OTHER PUBLICATIONS

European Search Report from EP 17 19 7609 dated Feb. 19, 2018.
Machine Translation of JP2001139880.

* cited by examiner

*Primary Examiner* — William K Cheung
(74) *Attorney, Agent, or Firm* — Fishman Stewart PLLC

(57) ABSTRACT

A bearing material may include a polyamide/imide plastics polymer material having an amine content including a fluorinated diamine and a non-fluorinated diamine.

20 Claims, 1 Drawing Sheet

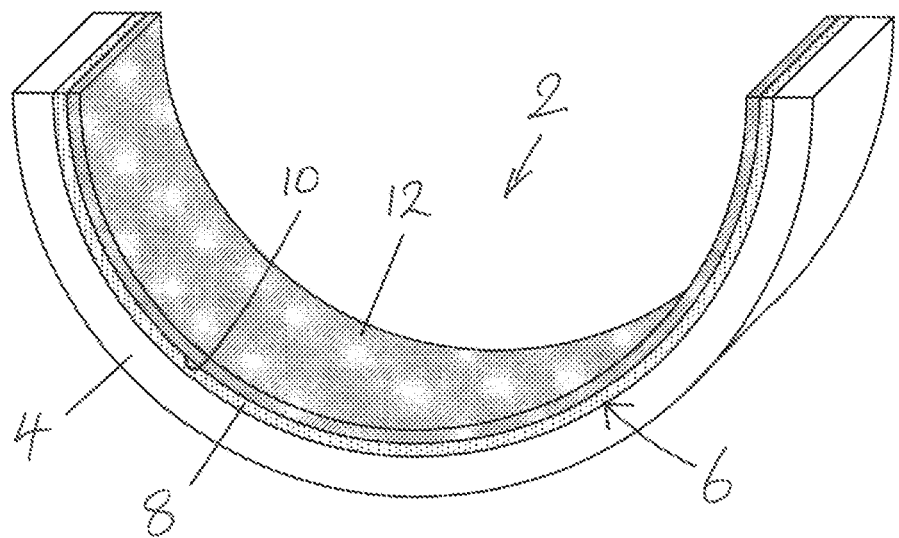

BEARING MATERIAL, BEARING AND METHOD

CROSS-REFERENCE TO RELATED APPLICATION

This application claims priority to GB 1618389.9 filed on Oct. 31, 2016, the contents of which are hereby incorporated by reference in their entirety.

TECHNICAL FIELD

The invention relates to a bearing material, a method for making the bearing material, and a bearing or bearing element comprising the bearing material. In particular, the invention relates to an improved plastics bearing material for use in forming a running surface or sliding surface of a plain bearing. Bearing materials and elements embodying the present invention are particularly suitable for use in automotive environments, including for supporting rotatable or slidable engine components and for use as, or as part of, other rotatable or slidable components such as thrust washers and flange bearing assemblies.

BACKGROUND

Bearing elements are generally known which comprise a steel back, a substrate layer and a sliding layer (or overlay or running layer). These are commonly used in engines, such as internal combustion engines, for example as crankshaft and/or camshaft supporting bearings and big end bearings and small end bushings in connection rods. They may also be used as thrust washers (axial bearings).

Plain bearings for use as crankshaft journal bearings in internal combustion engines, for example, are usually semi-cylindrical in form and have a layered construction. This construction typically comprises; a backing made from a strong backing material such as steel, of a thickness in the region of about 1 mm or more; a lining of a first bearing material adhered to the backing and of thickness from about 0.1 to 0.5 mm; and a layer of a second bearing material adhered to the surface of the first bearing material and having a thickness of less than about 40 μm. The surface of the second bearing material forms the actual running or sliding surface with a co-operating shaft journal surface.

The backing provides strength and resistance to deformation of the bearing shell when it is installed in a main bearing housing or in a connecting-rod big end, for example.

The first bearing material layer may provide suitable bearing running properties if the layer of the second bearing material should be worn through for any reason, and prevent the journal surface from coming into contact with the strong backing material. It also bonds to the backing, and supports and bonds to the second bearing material. The first bearing material may commonly be either an aluminium-based alloy or a copper-based alloy. Copper-based alloys, such as bronzes, are typically used in more highly-loaded bearings to provide additional support for the second bearing material layer.

The second bearing material layer which co-operates with the shaft journal may also be termed an overlay, or overlay layer. Conventionally, this has been formed by a relatively soft metal layer, to provide conformability (the ability of the bearing to accommodate small misalignments between the bearing surface and the shaft journal) and embedability (the ability to prevent debris, or dirt particles, which may circulate in the lubricating oil, from scoring or damaging the journal surface by enabling such debris to embed in the bearing surface).

More recently, bearing overlay layers comprising a matrix of plastics polymer material have been used. Examples are described in WO 2004/113749 and WO 2010/066396. Such overlay materials are commonly based on a matrix of polyamide-imide (PAI) containing various filler materials, such as hard reinforcing particles, soft particles of solid lubricant materials, and other components such as metal particles. Hard reinforcing particles may include ceramic or metal oxide particles. Solid lubricants may include materials such as graphite or molybdenum disulphide. Metal particles may include aluminium particles, such as aluminium flakes.

PAI materials have proved to be able to provide robust and effective bearing materials, including in the aggressive conditions of modern internal-combustion engines where stop-start operation, to reduce fuel consumption, requires a typical engine to undergo a greatly increased number of stop-start operations. Each time an engine restarts, full hydrodynamic lubrication may not be in place and so bearings such as crankshaft bearings need to be able to survive an increased number of non-hydrodynamically-lubricated start-up operations. PAI bearings, with suitable filler materials, have proved able to survive such conditions, but softer plastics materials have not provided adequate wear resistance for use as bearing overlay materials.

PAI bearing materials thus provide good performance, including conformability and embedability, but nevertheless the applicant for the present invention has found that it is advantageously possible to improve the performance of PAI bearing materials, and of bearings comprising these materials.

SUMMARY

The present invention provides a bearing material, a bearing element, and a method for making a bearing material as defined in the appended independent claims, to which reference should now be made. Some preferred or advantageous features of the invention are set out in dependent subclaims.

In a first aspect, the invention may thus provide a bearing material comprising a polyamide/imide plastics polymer material in which the polymer includes, in the amine content of the polymer, one or more fluorinated diamine(s) and one or more non-fluorinated diamine(s).

In other words, the polyamide-imide polymer molecule may comprise a chain or network of alternating amine and anhydride elements, such as acid anhydride elements, and the amine elements of the chain are derived from monomers in the form of one or more fluorinated diamine(s) and one or more non-fluorinated diamine(s). In the polymer chain the imide elements, or groups, originate from reaction of the anhydride elements with either the fluorinated diamines or the non-fluorinated diamines.

The inventor's experiments have demonstrated that this modified PAI material, which may be manufactured by adding a fluorinated monomer to an otherwise-conventional polymerisation reaction to form the modified PAI, may advantageously provide a bearing material that has both a more consistent friction coefficient than a conventional PAI bearing material and a reduced bearing-material wear rate.

The running-in period of a bearing is particularly important. During this period, the bearing material conforms to the counter-surface of the bearing (typically, for example, a steel journal). The inventor's experiments have shown that bearing materials embodying the invention may advantageously demonstrate a particular advantage over conventional PAI bearing materials during running-in, providing a more consistent fall in the bearing's friction coefficient during running-in. In such tests, the inventor compared conventional PAI bearings containing conventional filler materials in a PAI matrix, with bearings embodying the invention in which the same filler materials were incorporated into a modified PAI matrix.

After the running-in period, the inventor has found that bearing materials embodying the invention may advantageously continue to offer improved bearing performance, and reduced coefficient of friction, under conditions of hydrodynamic operation over longer periods of time.

Preferably, the fluorinated diamine comprises an aromatic fluorinated diamine, and particularly preferably it comprises a fluorinated dianiline, or is derived from the polymerisation of corresponding monomers.

Advantagesouly, the bearing material may comprise, or be formed by the polymerisation of, one or more of the following; 4,4'-(hexafluoroisopropylidene)bis(p-phenyleneoxy)dianiline; 2,5-Diaminobenzotrifluoride; 3,5-Diaminobenzotrifluoride; 1,3-Diamino-2,4,5,6-tetrafluorobenzene; 2,2'-Bis (trifluoromethyl) benzidine; 3,3'-Bis (trifluoromethyl) benzidine; 2,2-Bis [4-(4-aminophenoxy phenyl)] hexafluoropropane; 2,2-Bis (4-aminophenyl) hexafluoropropane; 2,2-Bis (3-amino-4-hydroxyphenyl)-hexafluoropropane; 2,2-Bis (3-amino-4-methylphenyl)-hexafluoropropane; 3,5-Difluorobenzene-1,2-diamine; 4,5-Difluorobenzene-1,2-diamine; 2-(Trifluoromethyl)benzene-1,4-diamine; 3,5-Diaminobenzotrifluoride; 2,4,5,6-Tetrafluorobenzene-1,3-diamine; 3,3,3-Trifluoropropane-1,2-diamine hydrochloride; 3,3'-Bis(trifluoromethyl)-[1,1'-biphenyl]-4,4'-diamine; 6-[(2,2,3,3,4,4,5,5,6,6,7,7,7-tridecafluoroheptyl)oxy]-1,3,5-triazine-2,4-diamine; 4-(1,1,2,2-tetrafluoroethoxy)benzene-1,3-diamine; 2-(Trifluoromethyl)pyrimidine-4,6-diamine; 2,4-Diaminobenzotrifluoride; 1,4-Diamino-2,6-difluorobenzene; 2,5-Difluorobenzene-1,4-diamine; Perfluorobenzene-1,4-diamine; and 6-[4-(Trifluoromethyl)phenyl]-1,3,5-triazine-2,4-diamine.

Preferably, the fluorinated diamine is aromatic. It is then particularly preferred that the fluorinated diamine is not ortho-substituted, but is meta- or para-substituted, and is preferably para-substituted. This may advantageously increase the flexibility of the polymer molecules, and decrease the hardness of the resulting polymer, improving the conformability and embedability of the bearing material without adversely affecting its strength.

In a preferred embodiment, the fluorinated diamine may comprise two aromatic rings. Advantageously, both aromatic rings may then be fluorinated.

The inventor's experiments have demonstrated that the molar ratio of the fluorinated diamine and the non-fluorinated amine (i.e. the number of moles of the fluorinated diamine divided by the number of moles of the non-fluorinated diamine) in the bearing material of the invention is preferably less than 0.5, 0.4, 0.3, 0.25 or 0.2, and/or is preferably more than 0.05, 0.08, 0.1 or 0.15. During fabrication of the bearing material, this ratio may advantageously be controlled by mixing corresponding quantities of the monomers used in the polymerisation to form the fluorinated diamine and the non-fluorinated amine portions of the fluorinated PAI polymer.

In a further aspect of the invention, the bearing material embodying the invention may be incorporated into a bearing or bearing element. This aspect of the invention thus provides a bearing element in which a bearing-surface layer comprises a bearing material embodying the invention. Preferably, the bearing-surface layer may also comprise other materials, such as fillers within a matrix of the bearing material.

Advantageously, any such fillers used in prior-art PAI bearing materials to enhance bearing properties such as conformability, embedability, wear resistance, bearing-material strength and low friction may be used in the same way in bearing materials embodying the present invention.

In a still further aspect, the invention may advantageously provide a method for making a bearing material comprising the steps of copolymerising an imide monomer, a fluorinated diamine and a non-fluorinated diamine to form a bearing material comprising a fluorinated polyamide/imide plastics polymer material.

The fluorinated diamine is an aromatic fluorinated diamine, and particularly preferably a fluorinated dianiline.

In a preferred embodiment, the fluorinated diamine used in the polymerisation reaction to form the bearing material comprises one or more selected from the following; 4,4'-(hexafluoroisopropylidene)bis(p-phenyleneoxy)dianiline; 2,5-Diaminobenzotrifluoride; 3,5-Diaminobenzotrifluoride; 1,3-Diamino-2,4,5,6-tetrafluorobenzene; 2,2'-Bis (trifluoromethyl) benzidine; 3,3'-Bis (trifluoromethyl) benzidine; 2,2-Bis [4-(4-aminophenoxy phenyl)] hexafluoropropane; 2,2-Bis (4-aminophenyl) hexafluoropropane; 2,2-Bis (3-amino-4-hydroxyphenyl)-hexafluoropropane; 2,2-Bis (3-amino-4-methylphenyl)-hexafluoropropane; 3,5-Difluorobenzene-1,2-diamine; 4,5-Difluorobenzene-1,2-diamine; 2-(Trifluoromethyl)benzene-1,4-diamine; 3,5-Diaminobenzotrifluoride; 2,4,5,6-Tetrafluorobenzene-1,3-diamine; 3,3,3-Trifluoropropane-1,2-diamine hydrochloride; 3,3'-Bis(trifluoromethyl)-[1,1'-biphenyl]-4,4'-diamine; 6-[(2,2,3,3,4,4,5,5,6,6,7,7,7-tridecafluoroheptyl)oxy]-1,3,5-triazine-2,4-diamine; 4-(1,1,2,2-tetrafluoroethoxy)benzene-1,3-diamine; 2-(Trifluoromethyl)pyrimidine-4,6-diamine; 2,4-Diaminobenzotrifluoride; 1,4-Diamino-2,6-difluorobenzene; 2,5-Difluorobenzene-1,4-diamine; Perfluorobenzene-1,4-diamine; and 6-[4-(Trifluoromethyl)phenyl]-1,3,5-triazine-2,4-diamine.

Advantageously, in the method for making the bearing material, the molar ratio of the fluorinated diamine and the non-fluorinated amine in the mixture that is polymerised to form the bearing material is controlled as follows. The molar ratio is less than 0.5, 0.4, 0.3, 0.25 or 0.2, and/or is preferably more than 0.05, 0.08, 0.1 or 0.15.

Other than incorporating the fluorinated diamine and the non-fluorinated amine in the mixture that is polymerised to form the bearing material, it is advantageously possible to follow known processes and procedures in other aspects of the polymerisation reaction and of the handling of the bearing material in the fabrication of a bearing element. This is an important advantage of the invention. With minimal changes to existing production methods and procedures, bearing elements incorporating bearing materials embodying the invention may be fabricated, providing improved performance by comparison with conventional bearing materials. This extends not only to the polymerisation and handling of the fluorinated PAI material, but also to processes for depositing the material onto the surfaces of bearings, for example by spraying, and the incorporation of other materials, such as particulate materials, into a matrix of the fluorinated PAI material to enhance its performance further.

A bearing element embodying the present invention may thus advantageously provide high load carrying capacity and enhanced wear resistance making it suitable for applications involving high temperatures and movement or rotation of components at high speeds, among others.

It may be noted that one conventional filler material incorporated into bearing materials to reduce sliding friction is a fluorinated compound, namely polytetrafluoroethylene (PTFE), and that attempts have been made in the past to incorporate fluorinated molecules into bearing materials with a view to reducing friction. However, such attempts have always led to a reduction in the physical integrity and strength of the bearing material and so to unacceptably-high wear rates. For example, patent application WO9738046 of Glyco Metall Werke describes the use of sliding layer materials predominantly consisting of thermoplastic fluoropolymers to which iron oxide is added to increase the resistance to wear of the sliding layer material, and U.S. Pat. No. 8,551,569 of Federal-Mogul Wiesbaden GmbH describes a method for producing a sliding element having a metal base material that is provided with a sliding layer having a thickness of more than 50 μm, in which a base material is coated with a paste of the sliding layer material that contains at least one high-temperature polymer in addition to a fluoropolymer, and the coated base material is subjected to a thermal treatment. As in WO9738046, the paste may contain a wear-reducing additive, such as iron (III) oxide.

However, such attempts to fabricate satisfactory fluorinated bearing materials have failed to produce any materials that can match the performance of the conventional PAI bearing materials, and still less the performance of the modified PAI bearing material of the present invention.

On the basis of these prior publications, it might be considered that modifying the conventional PAI material as proposed in the present invention, by fluorinating the polymer, would be expected to reduce the physical strength of the material and increase wear rates. This could, for example, extend not only to the physical integrity of the modified (fluorinated) PAI material itself, but also its ability to bond to filler materials and to the bearing substrate, but the inventor's experiments have demonstrated that by fluorinating the PAI material in the way described herein does not lead to such problems, and improves the performance of PAI bearing materials.

It may further be noted that, as mentioned above, conventional filler materials such as solid lubricants may advantageously be used to enhance the performance of bearing materials embodying the invention, and that one such filler material is PTFE.

Bearing elements embodying the invention may be particularly suitable for use in fluid-lubricated applications. Particularly advantageous applications for the bearing elements are as sliding bearings in combustion engines, for example crankshaft and/or camshaft supporting bearings, big end bearings and small end bushings. Bearing elements embodying the invention are particularly suitable for use in vehicle engines, including those equipped with stop-start engine technology in which the engine is subjected to a substantially greater number of starts over the life of the engine than in conventional engines and in which the crankshaft is regularly accelerated from rest before a uniform hydrodynamic film of lubricant is established on the bearing/running surface.

Bearing elements embodying the invention may also be used to form any of a number of sliding surfaces on engine components including bushes, piston skirts, piston rings, liners, camshafts and conrods. They may also be used as, or as part, of any of thrust washers, flanges and half liners. Other suitable applications are envisaged and will be readily apparent to the skilled person.

BRIEF DESCRIPTION OF THE DRAWING

Specific embodiments of the invention will now be described by way of example, with reference to the accompanying drawing, in which;

The FIG. 1 is a schematic diagram of a half-shell of a plain bearing.

DETAILED DESCRIPTION

The FIG. 1 shows a half shell 2 of a cylindrical sliding bearing comprising a strong backing 4 of steel, a bearing lining layer 6, comprising a layer 8 of a copper-based alloy or an aluminium-based alloy bonded to the backing and a nickel diffusion barrier, or interlayer, 10, and a plastics, polymer-based overlay layer 12 embodying the present invention bonded to the lining layer. In other embodiments of the invention the overlay may be bonded directly to the backing, and the lining layer omitted, depending on the compatibility of the materials used and the intended use of the bearing.

The overlay layer, or sliding layer, comprises a modified PAI resin matrix embodying the invention and fabricated as described below. The PAI matrix may incorporate filler materials as follows.

As in prior-art polymer bearings, the sliding layer material may optionally include at least one solid lubricant. Suitable solid lubricants include: metal sulphides with layered structures; graphite; hexagonal boron nitride (h-BN); molybdenum disulfide ($MoS_2$); tungsten disulphide ($WS_2$); PTFE; or a combination of any of these materials. Other suitable materials are envisaged and will be readily apparent to the skilled person.

Also as in prior-art polymer bearings, the sliding layer material may also include harder particles in powdered and/or flaked form. This may provide improved wear resistance. The harder particles may include, in any suitable combination, one or more different types of hard particle. Some suitable hard particles include nitrides, carbides, borides, oxides, and metal powders. Other suitable materials are envisaged and will be readily apparent to the skilled person.

The total thickness of the sliding layer material is between about 3 μm, or 6 μm, and about 14 μm. A preferred thickness of the sliding layer material for bearing elements embodying the present invention is between about 8 μm and about 12 μm, or particularly preferably in the range 9 μm to 11 μm.

A conventional PAI polymer for a bearing material is formed by the copolymerisation of polyamide imide monomers such as trimellitic anhydride and methylene diamine. These monomers are mixed in known manner, in combination with suitable solvents and catalytic materials, to allow the monomers to copolymerise. An initial polymerisation step produces a polymer which may be applied to the surface of a bearing element, for example by spraying, and cured to form a thermoset PAI bearing layer. This process is described in the prior art, such as in patent publications WO 2004/113749 and GB 2521004A.

In a preferred embodiment of the present invention, this prior art process is modified by substituting a fluorinated diamine monomer for at least a portion of the monomer that is to form the amide portion of the copolymer. The bearing material may thus be formed by the copolymerisation of three monomers, such as trimellitic anhydride and methylene diamine as used to make a conventional PAI material), and a fluorinated amine monomer. In the embodiments described below, the fluorinated amine monomer is 4,4'-(hexafluoroisopropylidene)bis(p-phenyleneoxy)dianiline. This mixture is then copolymerised using a conventional condensation polymerisation suitable for the synthesis of polyamide imides.

Two examples will now be described. In both examples, the overall molar ratio of amine monomers to anhydride monomers was 0.93. As is known in the conventional copolymerisation of PAI, this ratio can be varied from about 0.9 to less than 1, the excess of amine monomers being used to control the molecular weight of the resulting polymer. In the first example, in the amine fraction of the monomer mixture, the molar ratio of fluorinated monomer to non-fluorinated monomer was 0.1. In the second example, the ratio was 0.2.

In principle, the fluorinated monomer could be used as the whole contribution of the amine monomer, omitting the non-fluorinated amine monomer. The monomer mixture could then incorporate fluorinated monomer and anhydride monomer in a ratio of between 0.9 and less than 1, depending on the desired molecular weight of the polymer, but this may disadvantageously increase costs as the fluorinated monomer is more expensive than the non-fluorinated monomer, without providing benefits in bearing performance.

The quantites and molar ratios of the synthesis constituents in each example are set out below.

EXAMPLE 1

5% Fluorination

|  | Mass (g) | Moles | Molar ratios |
| --- | --- | --- | --- |
| Trimellitic anhydride | 10 | 0.052048 | 1 |
| 4,4'-(hexafluoroisopropylidene) bis(p-phenyleneoxy)dianiline | 2.5093 | 0.00484 | 0.092991 |
| methylene diamine | 8.636206 | 0.04356 | 0.836918 |

EXAMPLE 2

10% Fluorination

| 10% Fluoro | Mass (g) | Moles | Molar ratios |
| --- | --- | --- | --- |
| Trimellitic anhydride | 10 | 0.052048 | 1 |
| 4,4'-(hexafluoroisopropylidene) bis(p-phenyleneoxy)dianiline | 5.0193 | 0.00968 | 0.186007 |
| methylene diamine | 7.677361 | 0.038724 | 0.743998 |

Monomer mixtures having these compositions were prepared and copolymerisation reactions performed using conventional conditions for forming known PAI polymers, and samples of the polymers sprayed onto plain bearing shells to form sliding layers of thickness 10%. Corresponding conventional PAI polymers were also prepared, using the same 0.93 ratio of amine monomers to anhydride monomers, and sprayed onto bearing shells in the same way, for comparative testing.

Comparative wear tests were carried out, which demonstrated that the 5% fluorinated material of Example 1 lost material through wear at an average rate about 7% lower than the conventional material (in terms of volume of material lost, with wear tests carried out on a number of different samples), and the 10% fluorinated material of Example 2 lost material through wear at an average rate about 13% lower than the conventional material. These are significant reductions in wear rate, demonstrating that the modified PAI material of the invention maintains good integrity and strength, providing advantageously low wear rates.

Stribeck curves, plotting friction coefficient against sliding speed, for several samples of each type of bearing material were then prepared. In each case, the lubricated sliding of a steel journal against each bearing material was tested, and particular attention was paid to the running in phase of sliding and the steady state phase, which was reached after about 250 sliding cycles (rotations).

For the 5% fluoro-PAI copolymer formulation in Example 1, the measured initial friction coefficient was similar to the that of the conventional PAI polymer but the results varied less from sample to sample. This indicates that the run-in phase of the bearing material of Example 1 is similar that for the conventional bearing material, but that the behaviour of the bearing material of Example 1 is advantageously more predictable, or reliable, than that of the conventional material.

Friction measurements after the run-in period, after 250 cycles, demonstrated that the fluorinated coating has a lower coefficient of friction than the conventional material after the run in period. In conclusion, therefore, the 5% fluorinated material of Example 1 possesses similar frictional properties to a conventional PAI material on start up, but an advantageously lower coefficient of friction after the run in period, for example making it more suitable for start stop internal combustion engine applications.

For the 10% fluoro-PAI copolymer formulation in Example 2, the same tests were carried out. Again, the measured initial friction coefficient was similar to the that of the conventional PAI polymer in the test emulating engine start-up. In the same way as for the 5% fluoro-PAI material of Example 1, the measure initial friction was within the band of friction measurements for the conventional PAI polymer but the results were advantageously less varied, providing more reliable performance.

Friction measurements after the run-in period, after 250 cycles, for 10% fluoro-PAI copolymer formualtion demonstrated that the fluorinated coating has a lower coefficient of friction after run-in, again making it more suitable than the conventional PAI material for stop-start applications.

Interestingly, the measured coefficient of friction for the polymer of Example 2 was not significantly lower than for the polymer of Example 1. Therefore, the increase of fluorination from 5% to 10% reduced wear rates, as described above, but did not significantly further reduce friction coefficient.

Other fluorinated monomers that could be used instead of 4,4'-(hexafluoroisopropylidene) bis(p-phenyleneoxy)dianiline in the Examples include:
2,5-Diaminobenzotrifluoride
3,5-Diaminobenzotrifluoride
1,3-Diamino-2,4,5,6-tetrafluorobenzene
2,2'-Bis (trifluoromethyl) benzidine
3,3'-Bis (trifluoromethyl) benzidine
2,2-Bis [4-(4-aminophenoxy phenyl)] hexafluoropropane
2,2-Bis (4-aminophenyl) hexafluoropropane
2,2-Bis (3-amino-4-hydroxyphenyl)-hexafluoropropane
2,2-Bis (3-amino-4-methylphenyl)-hexafluoropropane
3,5-Difluorobenzene-1,2-diamine 4,5-Difluorobenzene-1,2-diamine
2-(Trifluoromethyl)benzene-1,4-diamine
3,5-Diaminobenzotrifluoride
2,4,5,6-Tetrafluorobenzene-1,3-diamine
3,3,3-Trifluoropropane-1,2-diamine hydrochloride
3,3'-Bis(trifluoromethyl)-[1,1'-biphenyl]-4,4'-diamine
6-[(2,2,3,3,4,4,5,5,6,6,7,7-tridecafluoroheptyl)oxy]-1,3,5-triazine-2,4-diamine
4-(1,1,2,2-tetrafluoroethoxy)benzene-1,3-diamine
2-(Trifluoromethyl)pyrimidine-4,6-diamine
2,4-Diaminobenzotrifluoride
1,4-Diamino-2,6-difluorobenzene
2,5-Difluorobenzene-1,4-diamine
Perfluorobenzene-1,4-diamine
6-[4-(Trifluoromethyl)phenyl]-1,3,5-triazine-2,4-diamine
4-(Trifluoromethoxy)benzene-1,3-diamine
2,2,3,3,4,4,5,5-Octafluoro-1,6-hexamethylenediamine Other conventional PAI monomers could also be used in place of the trimellitic anhydride and the methylene diamine used in the Examples.

The invention claimed is:

1. A bearing material comprising a polyamide/imide plastics polymer material, wherein an amine content of the polyamide/imide plastics polymer material includes a fluorinated diamine and a non-fluorinated diamine, and wherein the fluorinated diamine is a fluorinated dianiline.

2. The bearing material according to claim 1, wherein the fluorinated diamine comprises at least one of:
   4,4'-(hexafluoroisopropylidene)bis(p-phenyleneoxy)dianiline;
   2,5-Diaminobenzotrifluoride;
   3,5-Diaminobenzotrifluoride;
   1,3-Diamino-2,4,5,6-tetrafluorobenzene;
   2,2'-Bis (trifluoromethyl) benzidine;
   3,3'-Bis (trifluoromethyl) benzidine;
   2,2-Bis [4-(4-aminophenoxy phenyl)] hexafluoropropane;
   2,2-Bis (4-aminophenyl) hexafluoropropane;
   2,2-Bis (3-amino-4-hydroxyphenyl)-hexafluoropropane;
   2,2-Bis (3-amino-4-methylphenyl)-hexafluoropropane;
   3,5-Difluorobenzene-1,2-diamine;
   4,5-Difluorobenzene-1,2-diamine;
   2-(Trifluoromethyl)benzene-1,4-diamine;
   3,5-Diaminobenzotrifluoride;
   2,4,5,6-Tetrafluorobenzene-1,3-diamine;
   3,3,3-Trifluoropropane-1,2-diamine hydrochloride;
   3,3'-Bis(trifluoromethyl)[1,1'-biphenyl]-4,4'-diamine;
   6-[(2,2,3,3,4,4,5,5,6,6,7,7-tridecafluoroheptyl)oxy]-1,3,5-triazine-2,4-diamine;
   4-(1,1,2,2-tetrafluoroethoxy)benzene-1,3-diamine;
   2-(Trifluoromethyl)pyrimidine-4,6-diamine;
   2,4-Diaminobenzotrifluoride;
   1,4-Diamino-2,6-difluorobenzene;
   2,5-Difluorobenzene-1,4-diamine;
   Perfluorobenzene-1,4-diamine; and
   6-[4-(Trifluoromethyl)phenyl]-1,3,5-triazine-2,4-diamine.

3. The bearing material according to claim 1, wherein the fluorinated diamine is aromatic and is one of meta- or para-substituted.

4. The bearing material according to claim 1, wherein the fluorinated diamine comprises two aromatic rings, the two aromatic rings being fluorinated.

5. The bearing material according to claim 1, wherein a molar ratio of the fluorinated diamine and the non-fluorinated diamine is 0.4 to 0.05.

6. A bearing element comprising:
   at least one shell including a backing of steel;
   a bearing lining layer disposed on the backing of steel; and
   a bearing-surface layer disposed on the bearing lining layer, the bearing-surface layer including a bearing material composed of a polyamide/imide plastics polymer material; and
   wherein an amine content of the polyamide/imide plastics polymer material includes a fluorinated diamine and a non-fluorinated diamine.

7. The bearing element according to claim 6, wherein the bearing-surface layer further includes a plurality of hard particles of at least one other material within a matrix of the bearing material, and wherein the plurality of hard particles includes at least one of powdered particles and flaked particles.

8. A method for making a bearing element comprising:
   providing a backing of steel;
   forming a bearing material composed of a fluorinated polyamide/imide plastics polymer matrix via copolymerising an anhydride monomer, a fluorinated diamine, and a non-fluorinated diamine; and
   applying the bearing material onto a bearing lining layer disposed on the backing of steel to form a bearing-surface layer.

9. The method according to claim 8, wherein the fluorinated diamine is an aromatic fluorinated diamine.

10. The method according to claim 8, wherein the fluorinated diamine is a fluorinated dianiline.

11. The method according to claim 8, wherein the fluorinated diamine comprises at least one of:
    4,4'-(hexafluoroisopropylidene)bis(p-phenyleneoxy)dianiline;
    2,5-Diaminobenzotrifluoride;
    3,5-Diaminobenzotrifluoride;
    1,3-Diamino-2,4,5,6-tetrafluorobenzene;
    2,2'-Bis (trifluoromethyl) benzidine;
    3,3'-Bis (trifluoromethyl) benzidine;
    2,2-Bis [4-(4-aminophenoxy phenyl)] hexafluoropropane;
    2,2-Bis (4-aminophenyl) hexafluoropropane;
    2,2-Bis (3-amino-4-hydroxyphenyl)-hexafluoropropane;
    2,2-Bis (3-amino-4-methylphenyl)-hexafluoropropane;
    3,5-Difluorobenzene-1,2-diamine;
    4,5-Difluorobenzene-1,2-diamine;
    2-(Trifluoromethyl)benzene-1,4-diamine;
    3,5-Diaminobenzotrifluoride;
    2,4,5,6-Tetrafluorobenzene-1,3-diamine;
    3,3,3-Trifluoropropane-1,2-diamine hydrochloride;
    3,3'-Bis(trifluoromethyl)-[1,1'-biphenyl]-4,4'-diamine;
    6-[(2,2,3,3,4,4,5,5,6,6,7,7-tridecafluoroheptyl)oxy]-1,3,5-triazine-2,4-diamine;
    4-(1,1,2,2-tetrafluoroethoxy)benzene-1,3-diamine;
    2-(Trifluoromethyl)pyrimidine-4,6-diamine;
    2,4-Diaminobenzotrifluoride;
    1,4-Diamino-2,6-difluorobenzene;
    2,5-Difluorobenzene-1,4-diamine;
    Perfluorobenzene-1,4-diamine; and
    6-[4-(Trifluoromethyl)phenyl]-1,3,5-triazine-2,4-diamine.

12. The method according to claim 8, wherein the fluorinated diamine is aromatic and is one of meta- or para-substituted.

13. The method according to claim 8, wherein a molar ratio of the fluorinated diamine and the non-fluorinated diamine is 0.4 to 0.05.

14. The bearing element according to claim 6, wherein the bearing lining layer includes a layer of a copper-based alloy or an aluminium-based alloy bonded to the backing of steel.

15. The bearing element according to claim 14, wherein the bearing lining layer is the layer of the copper-based alloy or the aluminium-based alloy.

16. The bearing element according to claim 14, further comprising an interlayer disposed between the bearing lining layer and the bearing-surface layer.

17. The bearing element according to claim 16, wherein the interlayer is a nickel diffusion barrier.

18. The bearing element according to claim 6, wherein the bearing-surface layer has a thickness of 3 µm to 14 µm.

19. The bearing element according to claim 7, wherein the bearing-surface layer further includes at least one solid lubricant.

20. The method according to claim 8, wherein forming the bearing material includes controlling a molar ratio of the fluorinated diamine and the non-fluorinated diamine in the bearing material via mixing corresponding quantities of the anhydride monomer, the fluorinated diamine, and the non-fluorinated diamine.

\* \* \* \* \*